(12) United States Patent  
Lord et al.

(10) Patent No.: US 9,150,043 B2  
(45) Date of Patent: Oct. 6, 2015

(54) SYSTEM AND METHOD OF IMAGE AUGMENTATION

(71) Applicant: Sony Computer Entertainment Europe Limited, London (GB)

(72) Inventors: Nicholas Andrew Lord, London (GB); Thomas Lucas-Woodley, London (GB); William Oliver Sykes, London (GB); Adrien Bain, London (GB)

(73) Assignee: Sony Computer Entertainment Europe Limited (GB)

( * ) Notice: Subject to any disclaimer, the term of this patent is extended or adjusted under 35 U.S.C. 154(b) by 204 days.

(21) Appl. No.: 13/760,728

(22) Filed: Feb. 6, 2013

(65) Prior Publication Data

US 2013/0208006 A1    Aug. 15, 2013

(30) Foreign Application Priority Data

Feb. 13, 2012   (GB) .................................. 1202389.1

(51) Int. Cl.
    *G06K 9/00*   (2006.01)
    *B42D 1/00*   (2006.01)
    (Continued)

(52) U.S. Cl.
    CPC . *B42D 1/00* (2013.01); *A63F 13/02* (2013.01); *A63F 13/10* (2013.01); *G06K 9/00442* (2013.01); *G06K 9/00671* (2013.01); *G06K 9/3208* (2013.01); *G06K 9/3216* (2013.01); *G06T 11/00* (2013.01);
    (Continued)

(58) Field of Classification Search
    CPC ....... G06T 19/006; G06T 19/00; G06F 3/011; G06F 3/012; G06F 3/0304

USPC ...................... 345/629–633; 281/38; 715/757  
See application file for complete search history.

(56) References Cited

U.S. PATENT DOCUMENTS

2001/0044858 A1*  11/2001  Rekimoto ......................... 710/1  
2008/0194323 A1*   8/2008  Merkli et al. ................... 463/30  
(Continued)

FOREIGN PATENT DOCUMENTS

EP       2426641 A1    3/2012  
KR    20110091126 A    8/2011  
(Continued)

OTHER PUBLICATIONS

Search Report for Great Britain application No. GB1202389.1 dated Jun. 13, 2012.

(Continued)

*Primary Examiner* — Todd Buttram  
(74) *Attorney, Agent, or Firm* — Lerner, David, Littenberg, Krumholz & Mentlik, LLP (57) ABSTRACT

A book for use in an augmented reality system includes first and second pages. The first page is on a first leaf of the book and includes a first fiduciary marker for indicating the orientation of the book to a recognition system. The second page is on a second leaf of the book and includes a second fiduciary marker for indicating the orientation of the book to the recognition system and also page marker for indicating the page number of the second page to the recognition system. The page marker orientation is ambiguous without reference to a fiduciary marker. The page marker is positioned on the second page closer to an edge of the page than the second fiduciary marker to become visible to the recognition system before the second fiduciary marker, as the book is turned to the second page.

11 Claims, 9 Drawing Sheets

(51) Int. Cl.
*A63F 13/98* (2014.01)
*A63F 13/40* (2014.01)
*G06T 11/00* (2006.01)
*G06K 9/32* (2006.01)
*G06T 19/00* (2011.01)

(52) U.S. Cl.
CPC .... *A63F 2300/1093* (2013.01); *A63F 2300/69* (2013.01); *A63F 2300/8082* (2013.01); *G06K 2009/3225* (2013.01); *G06T 19/006* (2013.01)

(56) References Cited

U.S. PATENT DOCUMENTS

| | | | |
|---|---|---|---|
| 2008/0200153 | A1 | 8/2008 | Fitzpatrick et al. |
| 2008/0296390 | A1* | 12/2008 | Dudek .......................... 235/469 |
| 2010/0230946 | A1 | 9/2010 | Kanda |
| 2011/0280445 | A1* | 11/2011 | Lieberknecht et al. ....... 382/103 |
| 2011/0316266 | A1 | 12/2011 | Miranti |
| 2012/0050326 | A1* | 3/2012 | Tanaka .......................... 345/633 |
| 2013/0278635 | A1* | 10/2013 | Maggiore ..................... 345/633 |

FOREIGN PATENT DOCUMENTS

| | | |
|---|---|---|
| KR | 20120035321 A | 4/2012 |
| WO | 2004012141 A2 | 2/2004 |
| WO | 2012049795 A1 | 4/2012 |

OTHER PUBLICATIONS

Examination Report for Great Britain application No. GB1202389.1 dated Jun. 14, 2012.
Billinghurst, M et al., "The MagicBook: a transitional AR interface", Computers and Graphics, Elsevier, GB, vol. 25, No. 5, Oct. 1, 2001, pp. 745-753.
Examination Report for Great Britain application No. GB1209025.4 dated Sep. 19, 2012.
Grasset R et al., "The design of a mixed-reality book: Is it still a real book?", 7th IEEE/ACM International Symposium on Mixed and Augmented Reality (ISMAR), 2008, IEEE, Piscataway, NJ, USA, Sep. 15, 2008, pp. 99-102.
Search Report for Great Britain application No. GB1209025.14 dated Sep. 19, 2012.
Feng Zhou et al: "Trends in augmented reality tracking, interaction and display: A review of ten years of ISMAR", Mixed and Augmented Reality, 2008. ISMAR 2008. 7th IEEE/ACM International Symposium on, IEEE, Piscataway, NJ, USA, Sep. 15, 2008, pp. 193-202, XP031344009.
Grasset R et al: "The design of a mixed-reality book: Is it still a real booK?", Mixed and Augmented Reality, 2008. ISMAR 2008. 7th IEEE/ACM International Symposium on, IEEE, Piscataway, NJ, USA, Sep. 15, 2008, pp. 99-102, XP031343982.
Hyun S Yang et al: "Hybrid Visual Tracking for Augmented Books", Sep. 25, 2008, Entertainment Computing—ICEC 2008; [Lecture Notes in Computer Science], Springer Berlin Heidelberg, Berlin, Heidelberg, pp. 161-166, XP019109852.
Kyusung Cho et al: "A Realistic E-Learning System based on Mixed Reality", Proc 13th Intl Conference on Virtual Systems and Multimedia, Sep. 23, 2007, pp. 57-64, XP055081387.
Partial European Search report for Application No. 13152016 dated Oct. 18, 2013.

* cited by examiner

SYSTEM AND METHOD OF IMAGE AUGMENTATION

CROSS REFERENCE TO RELATED APPLICATIONS

The present application claims the benefit of and priority to GB Application No. 1202389.1, filed Feb. 13, 2012, the entire disclosure of which is incorporated by reference herein.

BACKGROUND OF THE INVENTION

1. Field of the Invention

The present invention relates to a system and method of image augmentation.

2. Description of the Prior Art

Augmented reality systems are known that use a video camera coupled to a computer to capture a video image, detect features of that captured video image, and then in response to the detected features, generate a graphical overlay to superpose on the captured video image which in some fashion augments the captured video image.

Figure 1:
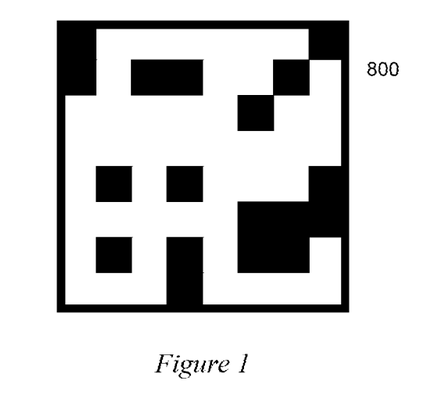
FIG. 1 is a schematic diagram of a fiduciary marker in accordance with an embodiment of the present invention.

Referring to FIG. 1, in a typical augmented reality application a so-called fiduciary marker 800 of a known size is included in the scene to be captured by the video camera, in order to provide an easily detectable feature.

Fiduciary markers are typically high-contrast (e.g. black and white) and asymmetric patterns, so providing scope for pattern recognition in even relatively poor image capture conditions (e.g. with low resolution image capture, poor lighting, and the like). Such recognition typically provides an estimation of the position (x and y axis position) and rotation (by virtue of the marker's asymmetry) of the fiduciary marker within the captured video image.

Optionally in addition the distance of the fiduciary marker (its z-axis position) from the video camera may be estimated by comparing the size of the fiduciary marker in the captured image with a known size of the fiduciary marker (e.g. its size in pixels at a distance of 1 meter).

Similarly, optionally a tilt of the fiduciary marker (i.e. its deviation from the x-y plane in the z direction) may be estimated by comparing the aspect ratio of the fiduciary marker in the captured image with the known aspect ratio of the fiduciary marker, and/or using other techniques such as detecting foreshortening (where a rectangular shape appears trapezoidal) or other distortions of the fiduciary marker in the captured video image.

The generated graphical overlay typically comprises a virtual graphics element that can then be superposed over the fiduciary marker, with the estimated position, rotation distance and tilt of the fiduciary marker used to modify the virtual graphics element as applicable.

The augmented image is then output to a display.

The subjective effect of this process is that the output video image comprises a graphical element (for example a monster or a castle) in place of the fiduciary marker, typically replicating the estimated position, rotation, distance and tilt of the fiduciary marker.

Alternatively, the fiduciary marker can be used in other ways. For example a graphical object can be positioned relative to the fiduciary marker but not covering it, or the fiduciary marker can be used to identify to an entertainment system or other computer a selected object or region of a scene; for example, placing a fiduciary marker on a table may cause an entertainment system to identify the table (for example by identifying a contiguous region of colour within a tolerance of the colour found near the fiduciary marker), after which the fiduciary marker can be removed.

However, it will be appreciated that in such augmented reality systems, the user's suspension of disbelief, which makes them complicit in the illusion that the graphical overlay is part of the captured scene, is at least in part dependent upon the reliability with which the graphical overlay matches or interacts with some real-world aspect of the scene. This reliability is frequently dependent upon estimates of the position and orientation of the fiduciary marker within the scene.

Thus it is desirable to reduce the occasions upon which such estimates cannot be reliably made.

SUMMARY OF THE INVENTION

In a first aspect, a book for use in an augmented reality system is provided in accordance with claim 1.

In another aspect, an entertainment device is provided in accordance with claim 7.

In another aspect, a method of augmenting an image of a book is provided in accordance with claim 12.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

A system and method of image augmentation are disclosed. In the following description, a number of specific details are presented in order to provide a thorough understanding of the embodiments of the present invention. It will be apparent, however, to a person skilled in the art that these specific details need not be employed to practise the present invention. Conversely, specific details known to the person skilled in the art are omitted for the purposes of clarity where appropriate.

Figure 2A:
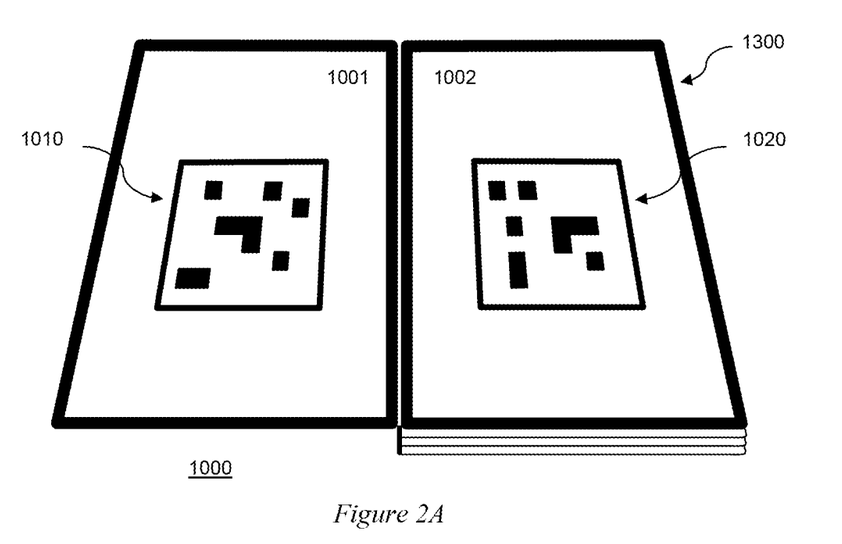
FIG. 2A is a schematic diagram of a book comprising a fiduciary marker, in accordance with an embodiment of the present invention.
Figure 2B:
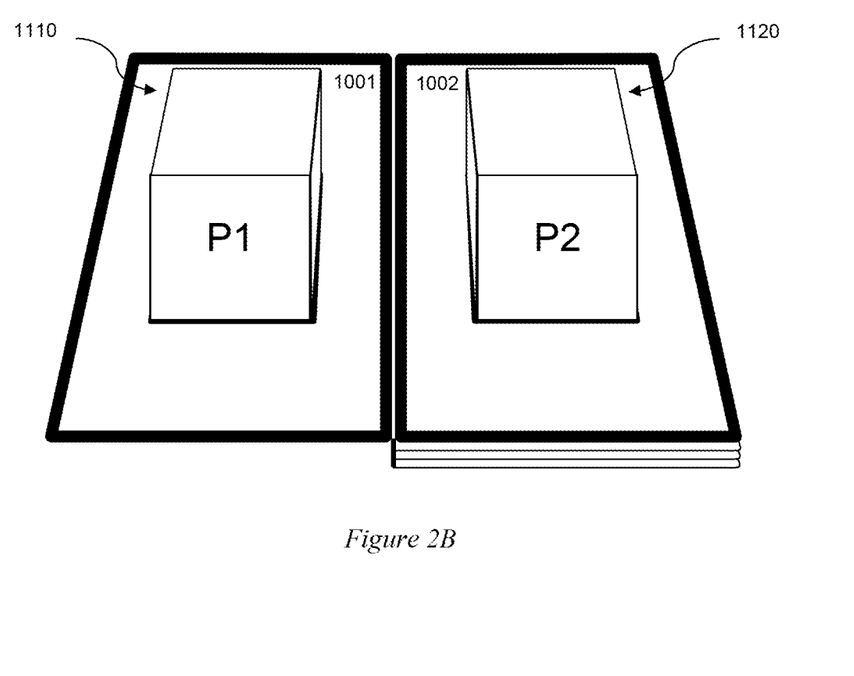
FIG. 2B is a schematic diagram of an image of a book augmented in accordance with an embodiment of the present invention.

Referring now to FIGS. 2A and 2B, in an embodiment of the present invention a book 1000 has a plurality of rigid, turnable leaves (a so-called 'board book'), and comprises fiduciary markings on each page 1010, 1020, as shown in FIG. 2A. A leaf will be understood to be a single turnable sheet or panel of a book and typically comprises a page on each side. FIGS. 2A and 2B show, by way of example, pages 1 and 2, labelled 1001 and 1002 respectively. Optionally the inside front and/or back covers of the book may also act as pages and comprise fiduciary markings. Similarly, optionally the outside front and/or back covers may comprise fiduciary markings. In addition, optionally each page is edged with a high contrast marking 1300 to facilitate detection of the extent of the page.

An entertainment device coupled to a video camera can capture an image of the book and use known techniques to detect the fiduciary markings on each visible page and hence locate those pages of the book. Given this information, the entertainment device can augment the captured video image of the book with pop-up virtual graphic elements 1110, 1120 corresponding to placement, scale and orientation of the fiduciary markings 1010, 1020 on the visible pages as shown in FIG. 2B, and output the augmented video image for display. In this way the displayed version of the book becomes a 'magic' pop-up book in which the pages can come to life.

Figure 3:
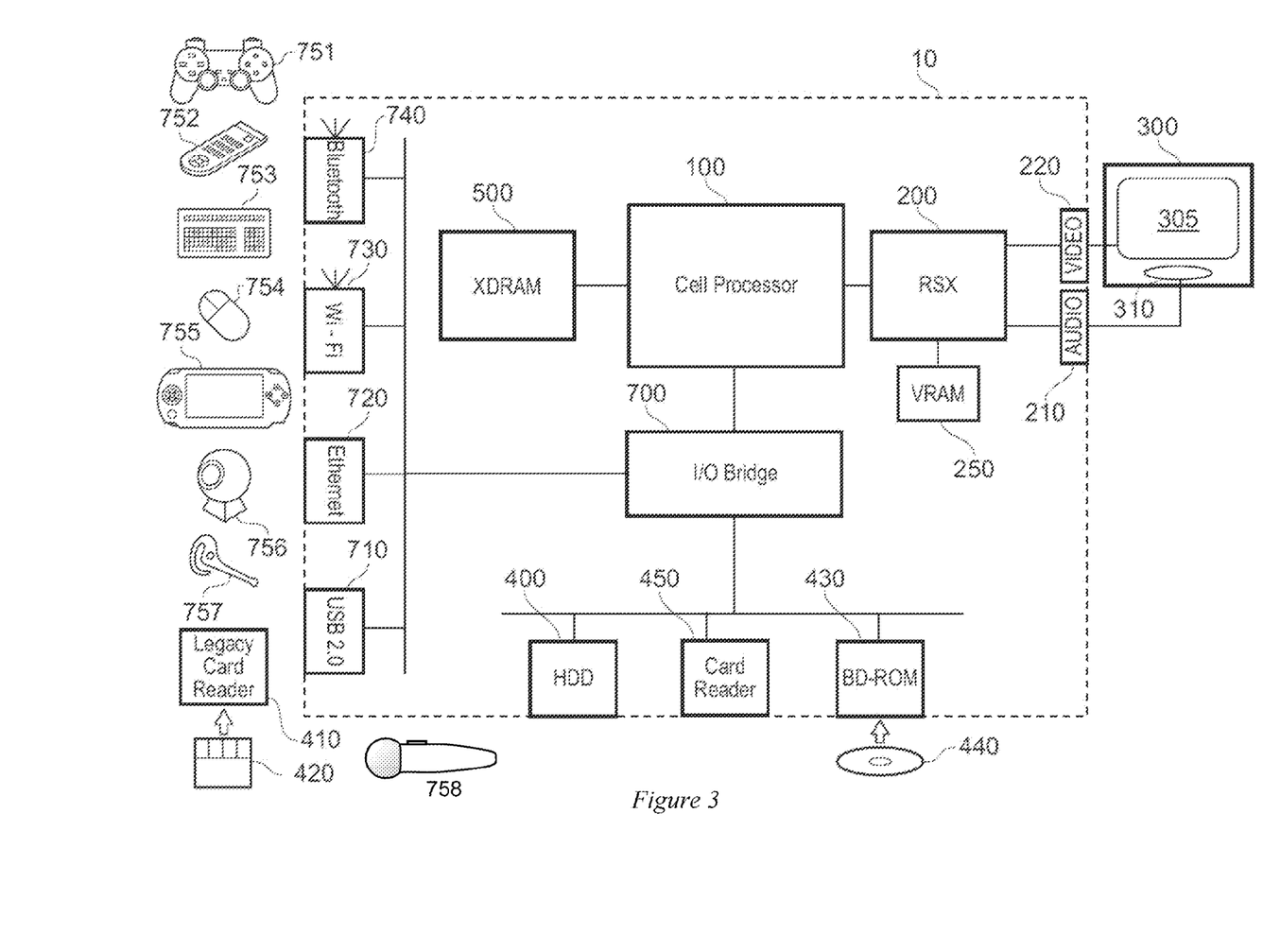
FIG. 3 is a schematic diagram of an entertainment device in accordance with an embodiment of the present invention.

FIG. 3 schematically illustrates the overall system architecture of a suitable entertainment device known as the Sony® Playstation 3® entertainment device or PS3®. The PS3 comprises a system unit 10, to which various peripheral devices are connectable including a video camera, as detailed below.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable®entertainment device; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

In particular, these connections enable a video camera such as an EyeToy® video camera 756 (or a stereoscopic video camera, not shown) to be coupled to the PS3 in order to capture a video image (or stereoscopic video image pair) of the book.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analog joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the portable entertainment device 755 or the Playstation Move® 758 may be used as a controller. In the case of the portable entertainment device, additional game or control information (for example, control instructions or number of lives) may be provided on the screen of the device. In the case of the Playstation Move, control information may be provided both by internal motion sensors and by video monitoring of the light on the Playstation Move device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In embodiments of the video camera, it is stereoscopic. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled person will be aware that a device driver or similar software interface may be required in the present embodiment described.

The software supplied at manufacture comprises system firmware and the Playstation 3 device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the function icons (representing the functions) horizontally using the game controller 751, remote control 752 or other suitable control device so as to highlight a desired function icon, at which point options pertaining to that function appear as a vertically scrollable list of option icons centred on that function icon, which may be navigated in analogous fashion. However, if a game, audio or movie disk 440 is inserted into the BD-ROM optical disk reader 430, the Playstation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demonstration games (demos) and other media may be downloaded, and a friends management capability, providing on-line communication with other Playstation 3 device users nominated by the user of the current device; for example, by text, audio or video depending on the peripheral devices available. The on-line capability also provides for on-line communication, content download and content purchase during play of a suitably configured game, and for updating the firmware and OS of the Playstation 3 device itself. It will be appreciated that the term "on-line" does not imply the physical presence of wires, as the term can also apply to wireless connections of various types.

Figure 4:
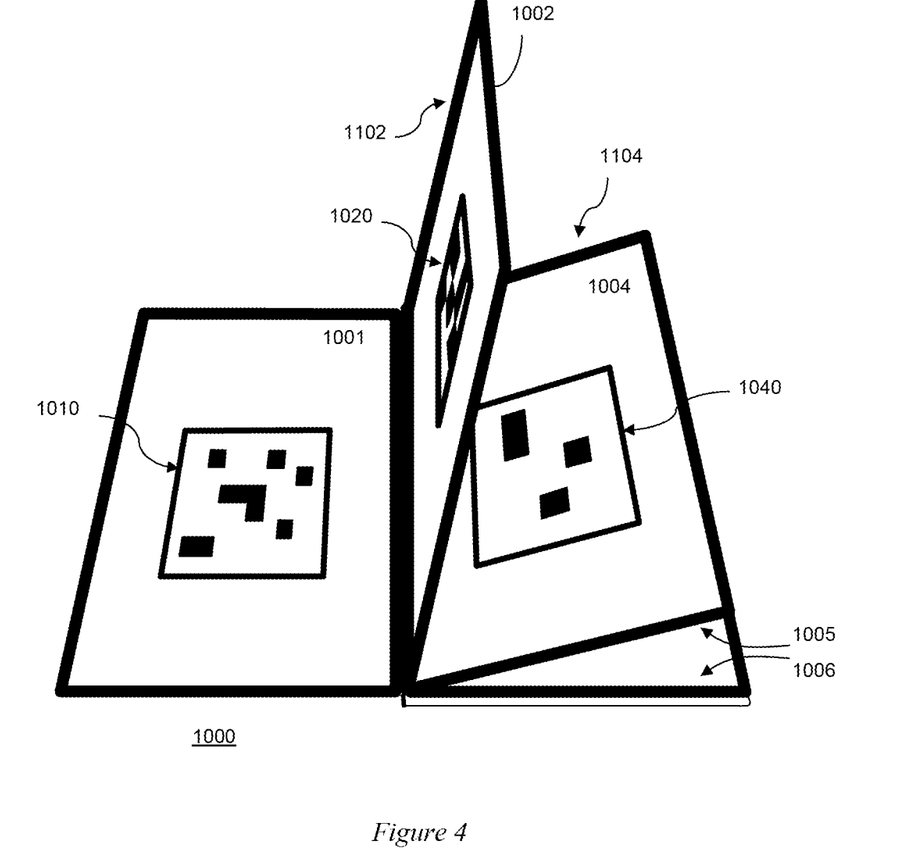
FIG. 4 is a schematic diagram of a book comprising a fiduciary marker, in accordance with an embodiment of the present invention.

Referring now to FIG. 4, it will be appreciated that whilst the fiduciary markers may be readily detected when the book is laid open and flat, several problems arise from the process of turning leaves of the book.

Firstly, it will be appreciated that as a user turns over a rigid leaf 1102 of the board book 1000, then for example pages 1 and 2 become obscured whilst page 3 (not shown, but located on the face of the leaf 1102 opposite to page 2) and page 4 (1004) are revealed. When the turning action is complete and pages 3 and 4 are fully revealed, the system can provide image augmentation of pages 3 and 4 in a similar manner to that previously described for pages 1 and 2 with reference to FIG. 2B.

However, a first problem that arises is that during the process of turning these pages there comes a point where the fiduciary marker 1020 on page 2 (for example) becomes so distorted by being viewed nearly edge-on to the camera that it is no longer recognisable by the entertainment device. At this point it becomes preferable to use an alternative technique of determining the position of the turning leaf of the book so that any animations dependent upon it (for example a pop-up animation showing objects between pages 1 and 2 folding down) are able to continue appropriately.

Such a technique is described in co-pending European application 10175548.6, incorporated herein by reference. A brief summary of the technique is described below with reference to FIG. 5.

Figure 5:
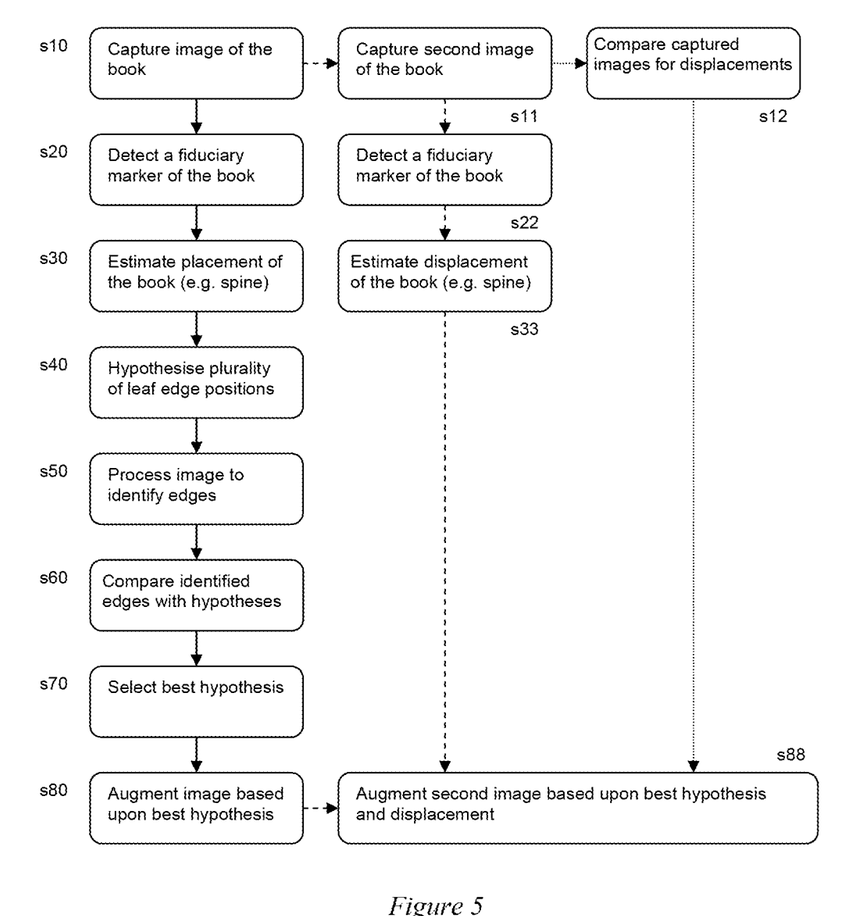
FIG. 5 is a flow diagram of a method of tracking the turning of a leaf of the book, in accordance with an embodiment of the present invention.

In a first step s10, a scene comprising the book is captured by a video camera or similar image capture device operably coupled to an image input of the PS3 (such as a USB port), resulting in an image including the book. As noted previously, the book itself comprises substantially rigid leaves.

In a second step s20, the PS3 attempts to detect fiduciary markings in the image (i.e. those visible in the book), for example using the Cell processor operating under suitable software instruction as a marking detector. Typically not all of a fiduciary marker is required to identify it if it comprises some form of spatially distributed redundancy in its markings.

In a third step s30, the image or partial image of the of the fiduciary marker on a page of the book is compared with a reference version of the marker to determine orientation and scale, and given a known physical relationship to the page (i.e. its printed position) this also provides an estimate of the orientation and scale of the book and in particular the placement of the spine of the book, which acts at the origin of rotation for the leaves of the book. Again the Cell processor may perform the comparison and the estimate the placement of the spine of the book, and the reference versions of the markers may be stored in RAM, on the hard disc, on an optical disk or on remote storage, or any other suitable storage medium or combination thereof.

Based upon the origin of rotation coincident with the spine of the book, in a fourth step s40 a plurality of possible positions for a turning leaf of the book are hypothesised. In particular, given the size of the leaf then the positions of the free edges of the leaf are hypothesised. Again here the Cell processor may operate as the hypothesising means.

To provide a basis of comparison with these hypotheses, in a fifth step s50 the captured image is processed to generate an image in which edges are identified. In addition data indicating the directions of these edges is generated. The image processing may be performed by the Cell processor, the Reality Synthesiser graphics unit or a combination of the two.

In a sixth step s60, the hypothesised edges of the turning leaf of the book are each evaluated with respect to the image comprising the identified edges and the directions of these edges using one of several possible scoring criteria as described previously. Again this evaluation or comparison may be performed using the Cell processor operating under suitable software instruction. Typically however, it is not necessary to compare each hypothesised edge with all the pixels of the processed image.

In a seventh step s70, the hypothesis whose predicted free edges of the turning leaf to generate the best score is assumed to be the best match to the actual turning leaf's position, with the Cell processor performing the selection of this hypothesis.

Finally in an eighth step s80 a virtual graphic element such as a picture or a polygonal object (e.g. a 2D rendering of a 3D virtual object) is superposed or otherwise incorporated into the captured image to augment it at a position consistent with the winning hypothesis. This image augmentation may be achieved by the Reality Synthesiser graphics unit combining the video and graphical elements, typically according to instructions from the Cell processor. The virtual graphic element itself may be stored locally in RAM, on the hard disc, or on an optical disk, may be remotely stored, or may be the product of a procedural graphics generation process such as a tree growth process.

Other possible steps are shown in FIG. 5 using dashed arrows. These include steps s11, s22, s33, which replicate steps s10, s20, and s30 for a second image of a stereoscopic image pair, and step s88, which replicates step 80 for an offset position (displacement) in the second image. Similarly, using dotted arrows step s12 provides an alternative determination of the displacement to that of s11, s22 and s33 using a direct image comparison for a stereoscopic image pair, for example by the Cell processor. In either case, this enables 3D augmentation for a stereoscopic display.

It will be appreciated that the above steps need not necessarily all be implemented in the above order. For example, the fifth step s50 may occur immediately after the first step s10.

It will be appreciated in general that the fiduciary markers may be used to initially detect the location, scale and orientation of the book, and to identify the page numbers, but then the bold edging of the pages may be used alternately or in addition to the fiduciary markers for frame-by-frame tracking of the book position, with the fiduciary markers only re-appraised periodically or when the Cell processor detects a shape of the page that may be ambiguous and require a non-symmetrical marker to resolve.

Returning to FIG. 4, it will also be appreciated that in addition to when a leaf is almost parallel to the line of sight and hence the marker on it becomes unresolvable, there is also a problem when a leaf is initially being turned. When a user begins to turn a rigid leaf 1104 of the book, it is not initially possible to see the fiduciary markers on the pages 1005, 1006 that will be revealed. As a result the augmentation of these pages as they are revealed may adopt one of two strategies:

In one strategy, augmentation of the revealed page(s) is delayed until the fiduciary marker is revealed to an extent sufficient to identify the page. However, this has the unsatisfactory effect of displaying the blank book and partial fiduciary marker before the augmentation suddenly 'switches on'. This destroys the suspension of disbelief that is the charm of such a 'magic' book, particularly for children.

Consequently in another strategy, the PS3 can assume that the pages to be revealed are the next two pages following those currently visible, and so augment the book based on the content of these next two pages as they are progressively revealed. This retains the illusion of the book, but has the problem that if the user has turned more than one leaf, then the content will be incorrect, and must be changed once the fiduciary marker for the actual revealed page is resolvable. This will result in a sudden switch in displayed content, again spoiling the illusion and also, for small children, being potentially confusing.

Notably, estimating which page will be revealed from the apparent thickness of the leaf or leaves being turned is not sufficiently reliable as the typical resolution of the cameras used is not high enough to support this third strategy, whilst making the leaves thick enough to address this would make the book format unwieldy.

Figure 6:
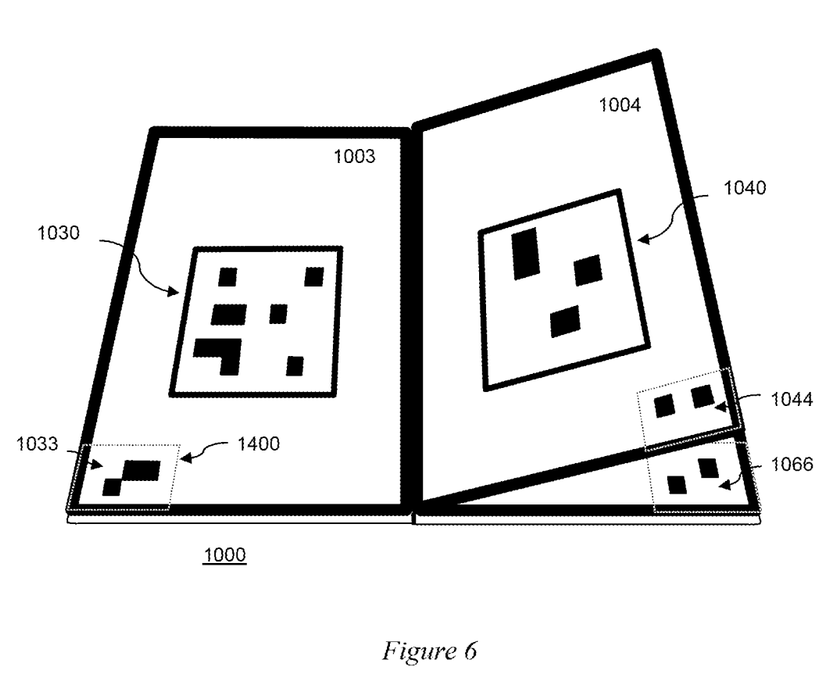
FIG. 6 is a schematic diagram of a book comprising a fiduciary marker and a page marker, in accordance with an embodiment of the present invention.

Referring now to FIG. 6, the present inventors have appreciated that it is possible to add a machine readable marker identifying a page within a region 1400 of the page that will be revealed early in the turning process, such as the outer corner facing the camera. The region itself exists in a fixed relation to the edging marker of the book 1300 and hence can be found by reference to the page edge or corner. Hence in FIG. 6, pages 3 and 4 are identified both by their fiduciary markers 1030, 1040 and by their page markers 1033, 1044. Meanwhile, a new page is only partially revealed, and so whilst its main fiduciary marker is not visible, its page marker 1066 can be resolved and hence the page can be identified as page 6.

In this way the correct augmentation of a page can be selected much earlier in the leaf turning process, enabling either the first or second augmentation strategy above to be more effective.

In particular, the page marking region can occupy a portion of the page near the outside corner of each page that is typically used as a blank margin for augmented content; consequently, the page can be resolved before page specific content is visible, and so the strategy of assuming the revealed page to be the next page may be used, as a switch to a different page's content will not be noticeable if each page shares a similar margin. In this way augmentation can be applied from the moment it is recognised that a page is being turned, and so the illusion of the 'magic' book is preserved.

It will be understood that in the above description, the corner will be one closest to the camera (as depicted in the present figures); in normal use this corner will appear to the actual reader/holder to be at the top of the book. Of course, such page markers could be printed in each corner to allow the book to also be held the other way around.

It will be appreciated that the page markings need to be of a similar type (i.e. in terms of feature size and contrast) to those of the main fiduciary marker (e.g. 1030, 1040, etc) in order to operate in a manner consistent with the main fiduciary markers; in other words in order for the page markers to be useful, the PS3 has to be able to resolve the page markers at similar distances and in similar lighting conditions to the main fiduciary markers, because users will assume that if the book is 'working' (i.e. augmentation is occurring) in response to the fiduciary markers then the desired page turning augmentation should also work. Consequently in practice the markers cannot simply be alphanumeric markers (literal page numbers or letters), as these would need to be large to be similarly robust to the fiduciary markers, and (in conjunction with the shapes of many letters and numbers) this militates against their recognition very early in the page turning process.

Whilst any suitable pattern of markings of a similar nature to those found in the main fiduciary markers (e.g. markers 1030, 1040, etc) may be envisaged, in an embodiment of the present invention a page marker scheme is described with reference to FIGS. 7A to 7C in which 6 segments, corresponding to 6 bits, may either be marked or unmarked, thereby generating a 6-bit pattern capable of uniquely identifying up to 64 pages. The pattern is shown in the figures with respect to the edge marking 1300 at a corner of the page. It will be appreciated that different numbers of segments/bits may be provided depending on how many pages are in a particular book 1000, and/or that not all bit patterns may be used, or may be used in a particular sequence (e.g. non-linear and/or non-contiguous). Hence 6 bits is a non-limiting number.

Figure 7A:
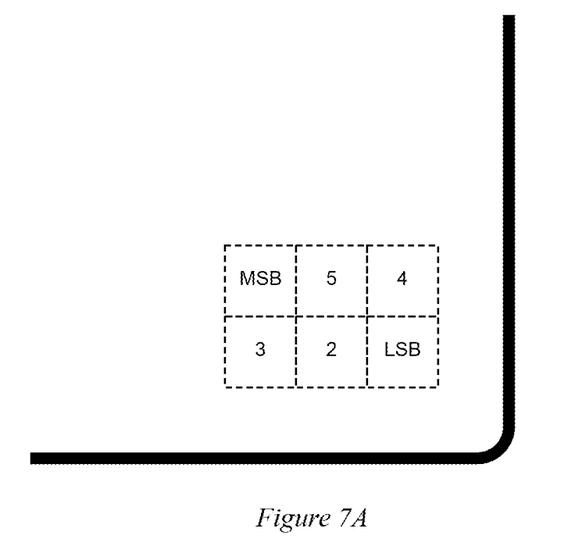
FIGS. 7A to 7C are schematic diagrams of a page marker in accordance with an embodiment of the present invention.

In FIG. 7A, a possible and non-limiting bit arrangement for the above 6 segment example is shown, in which the least significant 3 bits are positioned closest to the bottom edge of the page so that they are revealed by the turning process first and more quickly. In conjunction with the second augmentation strategy discussed above, it may initially be assumed that the three most significant bits of the new page will be the same as the current page (on the basis that turning a number of pages at the same time, which could change the pattern of the 3 most significant bits, is less likely). Consequently the full page number of the page being revealed may be very quickly initially estimated using the three most significant bits of the current page number and the three least significant bits as they are revealed by the page turning process.

This initial estimate can be quickly confirmed or corrected when the three most significant bits are revealed as the page turn continues.

It will be appreciated that the page marker may be positioned and orientated to reveal sections of the bit pattern simultaneously for ease of recognition; for example, the bit patterns may be angled such that in normal use they appear parallel to the angled nearside edge of the turning page at the point where the page is turned enough to show that section of code.

It will be understood that the nearside edge refers to the edge of the book or page closest to the camera; in normal use it will appear to be the top edge for the actual reader/holder of the book.

Figure 7B:
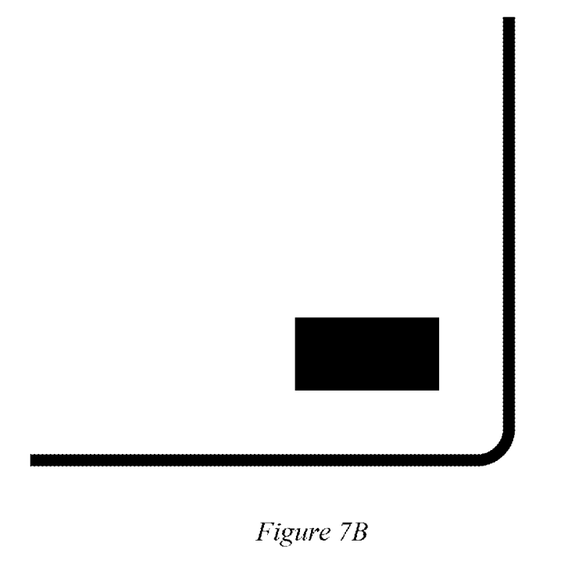

Notably, in general the page markers themselves can be ambiguous; for example the page marker in FIG. 7B may indicate page 3, using the 6 bit scheme described above, or in the same scheme may indicate page 36 of a book held at 90 degrees to the expected orientation.

Figure 7C:
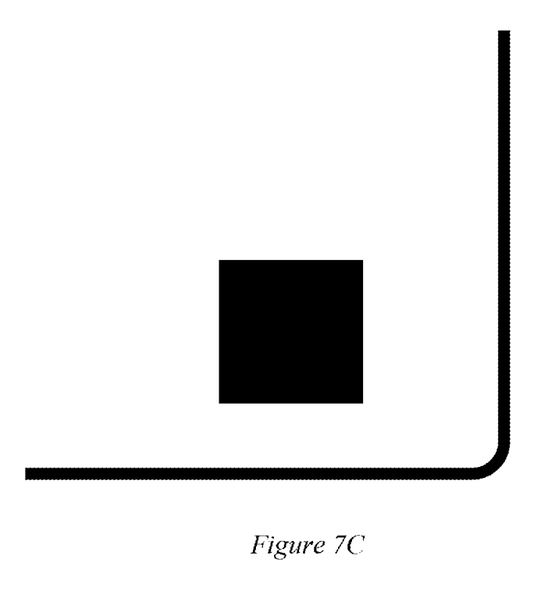

Similarly in FIG. 7C, the marker may indicate page 54 of a book (if interpreted as shading the left-most four segments of the bit pattern), or may indicate page 2 of a book held twice as far from the camera (if interpreted as a single segment at the wrong scale).

Consequently, reliable reading of a page marker requires recognition of at least one main fiduciary marker on another page of the book to resolve the orientation and scale of the book in the captured images. Hence, referring back to FIG. 6, recognition of page marker 1046 requires knowledge of the scale and orientation of the book obtained from fiduciary marker 1030 and/or 1040, either directly (i.e. by analysis of the or each fiduciary marker in the presently captured frame) or by using one or both of these previously to initialise tracking of the page edge marking 1300 (or some other tracking system) in the presently captured frame.

Hence the book comprises a fiduciary marker visible on one page that is used to resolve a page marker on another page, where that page marker is positioned to be visible to the camera earlier than a corresponding fiduciary marker on that other page as that other page is revealed by turning a leaf of the book.

Hence in a summary embodiment of the present invention, a book 1000 for use in an augmented reality system (such as one provided via a PS3 10) comprises a first page (1001, 1002, 1003, 1004) on a first leaf of the book (1102, 1104) comprising a first fiduciary marker (1010, 1020, 1030, 1040) for indicating the orientation of the book to a recognition system (e.g. PS3 10). It also comprises a second page (e.g. page marker 1006) on a second leaf of the book comprising a second fiduciary marker (not shown) similarly provided for indicating the orientation of the book to the recognition system, and also page marker 1066 for indicating the page number of the second page to the recognition system. The page marker is positioned on the second page closer to an edge of the page than the second fiduciary marker (e.g. the nearside edge with respect to the camera 756 of the recognition system) so as to become visible to the recognition system before the second fiduciary marker, as the book is turned to the second page.

In an instance of the summary embodiment, the page marker comprises a non-alphanumeric pattern. Similarly, in an instance of the summary embodiment, at least a first part of the page marker is positioned in a margin region of the page where page-specific augmentation of the book will not initially occur. For example, the first part may comprise the pattern corresponding to the first N least significant bits of the page number, where N is predetermined by the book designer. Hence the page marker may encode the page number as bits, comprising a most significant bit and a least significant bit, and the pattern of the page marker may be arranged so that the least significant bit is positioned to become visible to the recognition system before the most significant bit as the book is turned to the second page.

To facilitate recognition, in an instance of the summary embodiment one or more parts of the page marker are positioned to align with the edge of a leaf at the point where the leaf has turned sufficiently to reveal the or each respective part of the page marker. Thus for example different rows of bit patterns may be angled slightly differently on a page.

Similarly, in a summary embodiment of the present invention an entertainment device such as PS3 10 comprises a video input (for example a USB port 720) for receiving captured video frames comprising an image of the book 1000 as described herein. The Cell processor of the PS3, operating under suitable software instruction, acts as a fiduciary marker recognition processor operable to recognise a first fiduciary marker (1010, 1020, 1030, 1040) printed on a first page (1001, 1002, 1003, 1004) of the book and operable to estimate an orientation of the book based upon the recognised first fiduciary marker. Similarly the Cell processor of the PS3, again operating under suitable software instruction, also acts as a page marker recognition processor operable to recognise a page marker (e.g. page marker 1006) printed on a second page of the book with reference to the estimated orientation of the book as based upon the recognised first fiduciary marker printed on the first page of the book.

The estimation of the orientation can be direct or indirect. That is to say, in an instance of this summary embodiment the estimation of the orientation of the book for a current captured video frame can be based upon recognition of the first fiduciary marker within the current captured video frame, whilst in another instance the estimation of the orientation of the book for a current captured video frame is based upon a tracking process previously initialised based upon recognition of the first fiduciary marker within an earlier captured video frame.

In an instance of this summary embodiment the entertainment device can attempt to estimate the page number of the revealed second page even earlier in the leaf-turning process. Hence when the page marker on the second page of the book is only partially revealed by turning a leaf of the book, the page marker recognition processor estimates the page number of the second page based upon the page number of a currently open page of the book in conjunction with the partially revealed pattern of the page marker. As described previously, this can be achieved by combining the bits of a page number for a page where a fiduciary marker and page marker are visible with those bits that can be determined from the partial page marker pattern at the present stage of turning the leaf. This process is simplified if the pattern of the page marker is positioned to reveal less significant bits first.

Finally, in an instance of this summary embodiment the entertainment device comprises a graphics processor (such as the RSX Reality Synthesiser graphics unit 200) for applying augmented reality graphics to the captured video image, typically under instruction from the Cell processor; and consequently the entertainment device is arranged to apply augmented reality graphics to a revealed portion of the second page of the book in the captured video frame before recognising a second fiduciary marker printed on the second page of the book (in other words, before the second fiduciary marker is revealed by the turning of a leaf of the book).

Figure 8:
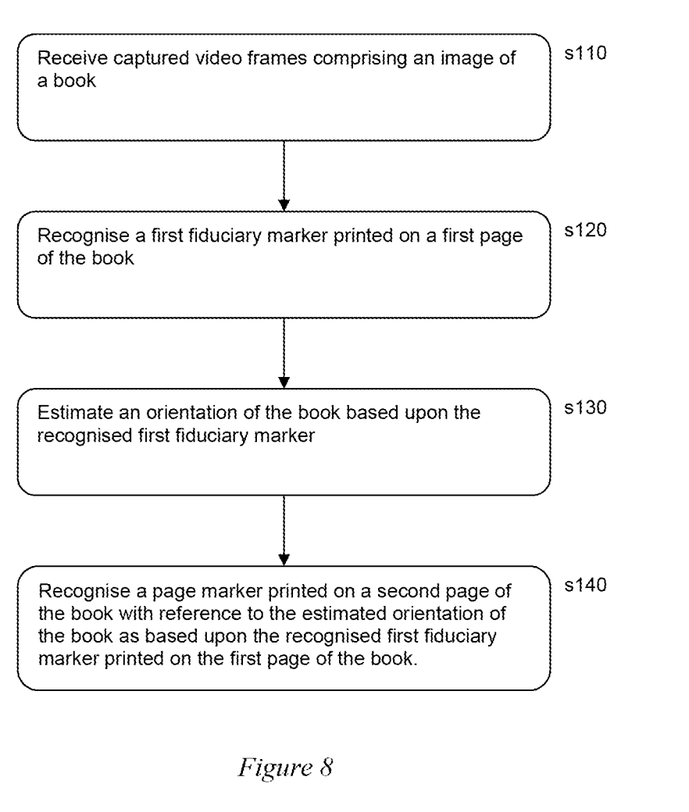
FIG. 8 is a flow diagram of a method of augmenting an image of a book, in accordance with an embodiment of the present invention.

Turning now to FIG. 8, a method of augmenting an image of a book comprises:

In a first step s110, receiving captured video frames comprising an image of a book (such as the book described herein);

In a second step s120, recognising a first fiduciary marker printed on a first page of the book;

In a third step s130, estimating an orientation of the book based upon the recognised first fiduciary marker; and In a fourth step s140, recognising a page marker printed on a second page of the book with reference to the estimated orientation of the book as based upon the recognised first fiduciary marker printed on the first page of the book.

It will be apparent to a person skilled in the art that variations in the above method corresponding to operation of the various embodiments of the apparatus as described and claimed herein are considered within the scope of the present invention, including but not limited to:

when the page marker on the second page of the book is partially revealed by turning a leaf of the book, the step of recognising a page marker comprising estimating the page number of the second page based upon the page number of a currently open page of the book in conjunction with the partially revealed pattern of the page marker, for example by combining different bits of a code representing the page number as described previously herein; and applying augmented reality graphics to a revealed portion of the second page of the book in the captured video frame before recognising a second fiduciary marker printed on the second page of the book.

Finally, it will be appreciated that the methods disclosed herein may be carried out on conventional hardware suitably adapted as applicable by software instruction or by the inclusion or substitution of dedicated hardware. Thus the required adaptation to existing parts of a conventional equivalent device may be implemented in the form of a computer program product or similar object of manufacture comprising processor implementable instructions stored on a data carrier, such as a floppy disk, optical disk, hard disk, PROM, RAM, flash memory or any combination of these or other storage media that may be considered to be non-transitory machine readable signal bearing media tangibly encoded with a program, or similarly may be realised in hardware as an ASIC (application specific integrated circuit) or an FPGA (field programmable gate array) or other configurable circuit suitable to use in adapting the conventional equivalent device. Alternatively the program may be transmitted via data signals on a network such as an Ethernet, a wireless network, the Internet, or any combination of these or other networks.

Although illustrative embodiment of the invention have been described in detail herein with reference to the accompanying drawings, it is to be understood that the invention is not limited to those precise embodiments, and that various changes and modifications cane be effected therein by one skilled in the art without departing from the scope and spirit of the invention as defined by the appended claims.

We claim:

1. An augmented reality system including a recognition system and a book, the book comprising:
   a first page on a first leaf of the book comprising a first fiduciary marker for indicating an orientation of the book to the recognition system;
   a second page on a second leaf of the book comprising a second fiduciary marker and also a page marker for indicating a page number of the second page to the recognition system;
   wherein:
   an orientation of the page marker is ambiguous without reference to a fiduciary marker; and
   the page marker is positioned closer to an edge of the second page than the second fiduciary marker, so as to become visible to the recognition system before the second fiduciary marker as the book is turned to the second page;
   in which:
   the page marker encodes the page number as bits, comprising a most significant bit and a least significant bit, and
   the page marker comprises a pattern in which the least significant bit of the pattern is positioned to become visible to the recognition system before the most significant bit of the pattern as the book is turned to the second page; and
   the recognition system including a page marker recognition processor configured to recognize the page marker printed on the second page of the book with reference to the estimated orientation of the book as based upon the recognized first fiduciary marker printed on the first page of the book.

2. An augmented reality system according to claim 1, in which the page marker comprises a non-alphanumeric pattern.

3. An augmented reality system according to claim 1 in which at leasta first part of the page marker is positioned in a margin region of the page where page-specific augmentation of the book will not initially occur.

4. An augmented reality system according to claim 1 in which one or more parts of the page marker are positioned to align with an edge of a leaf at the point where the leaf has turned sufficiently to reveal the or each respective part of the page marker.

5. An entertainment device, comprising:
   a video input for receiving captured video frames comprising an image of a book in accordance with claim 1;
   a fiduciary marker recognition processor operable to recognise a first fiduciary marker printed on a first page of the book and operable to estimate an orientation of the book based upon the recognised first fiduciary marker; and
   when the page marker on the second page of the book is partially revealed by turning a leaf of the book, the page marker recognition processor estimates a page number of the second page based upon a page number of a currently open page of the book in conjunction with the partially revealed pattern of the page marker.

6. An entertainment device according to claim 5 in which the estimation of the orientation of the book for a current captured video frame is based upon recognition of the first fiduciary marker within a current captured video frame.

7. An entertainment device according to claim 5 in which the estimation of the orientation of the book for a current captured video frame is based upon a tracking process previously initialised based upon recognition of the first fiduciary marker within an earlier captured video frame.

8. An entertainment device, comprising:
- a video input for receiving captured video frames comprising an image of a book in accordance with claim 1;
- a fiduciary marker recognition processor operable to recognise a first fiduciary marker printed on a first page of the book and operable to estimate an orientation of the book based upon the recognised first fiduciary marker;
- a graphics processor for applying augmented reality graphics to the captured video image;
- and in which
- the entertainment device is arranged to apply augmented reality graphics to a revealed portion of the second page of the book in the captured video frame before recognising a second fiduciary marker printed on the second page of the book.

9. A method of augmenting an image of a book, comprising the steps of:
- receiving, by a processor, captured video frames comprising an image of a book in accordance with claim 1;
- recognising, by the processor, a first fiduciary marker printed on a first page of the book;
- estimating, by the processor, an orientation of the book based upon the recognised first fiduciary marker; and
- when the page marker on the second page of the book is partially revealed by turning a leaf of the book, the step of recognising the page marker comprises estimating a page number of the second page based upon a page number of a currently open page of the book in conjunction with the partially revealed pattern of the page marker.

10. A method of augmenting an image of a book, comprising:
- receiving, by a processor, captured video frames comprising an image of a book in accordance with claim 1;
- recognising, by the processor, a first fiduciary marker printed on a first page of the book;
- estimating, by the processor, an orientation of the book based upon the recognised first fiduciary marker;
- applying augmented reality graphics to a revealed portion of the second page of the book in the captured video frame before recognising a second fiduciary marker printed on the second page of the book.

11. A computer program product embodied on a non-transitory computer readable medium, the computer readable medium storing computer implementable instructions thereon, the instructions, when executed, causing a processor to implement the steps of:
- receiving captured video frames comprising an image of a book in accordance with claim 1;
- recognising a first fiduciary marker printed on a first page of the book;
- estimating an orientation of the book based upon the recognised first fiduciary marker; and
- when the page marker on the second page of the book is partially revealed by turning a leaf of the book, the step of recognising the page marker comprises estimating a page number of the second page based upon a page number of a currently open page of the book in conjunction with the partially revealed pattern of the page marker.

* * * * *